United States Patent
Neubauer et al.

(10) Patent No.: US 9,815,637 B2
(45) Date of Patent: Nov. 14, 2017

(54) APPARATUS FOR ORIENTING COMPONENTS OF A ROTARY MACHINE

(71) Applicant: KRONES AG, Neutraubling (DE)

(72) Inventors: Michael Neubauer, Riedering (DE); August Peutl, Woerth/Donau (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/912,719

(22) PCT Filed: Jul. 25, 2014

(86) PCT No.: PCT/EP2014/066021
§ 371 (c)(1),
(2) Date: Feb. 18, 2016

(87) PCT Pub. No.: WO2015/032548
PCT Pub. Date: Mar. 12, 2015

(65) Prior Publication Data
US 2016/0200524 A1 Jul. 14, 2016

(30) Foreign Application Priority Data
Sep. 4, 2013 (DE) .......... 10 2013 217 674

(51) Int. Cl.
*B65G 29/00* (2006.01)
*B65G 47/00* (2006.01)
(Continued)

(52) U.S. Cl.
CPC .......... *B65G 47/244* (2013.01); *B41J 3/4073* (2013.01); *B65C 9/0062* (2013.01); *B65G 29/00* (2013.01); *B29C 49/36* (2013.01)

(58) Field of Classification Search
None
See application file for complete search history.

(56) References Cited

U.S. PATENT DOCUMENTS

| 5,399,302 A | 3/1995 | Noguchi et al. | |
| 5,539,293 A * | 7/1996 | Randall ................ | G01D 5/2492 318/400.12 |
| 7,497,323 B2 * | 3/2009 | Davidson .................. | B65C 9/04 198/474.1 |

FOREIGN PATENT DOCUMENTS

| CN | 1271319 A | 10/2000 |
| CN | 200977722 Y | 11/2007 |

(Continued)

OTHER PUBLICATIONS

German Search Report for Application No. 10 2013 217 674.0, dated Jan. 21, 2014.

(Continued)

*Primary Examiner* — Kavel Singh
(74) *Attorney, Agent, or Firm* — Marshall, Gerstein & Borun LLP

(57) ABSTRACT

Apparatus and method for orienting components of a rotary machine, such as a container treatment machine, where the rotary machine comprises a stator and a rotor and also at least one component which is arranged on the stator, wherein the apparatus comprises at least one reference element which is arranged on the stator and a sensor which is arranged on the rotor so as to rotate with it, wherein the sensor is suitable for measuring the distance from the reference element and from the component, and the stator, the rotor and the component can be oriented in relation to one another based on the values measured by the sensor.

16 Claims, 3 Drawing Sheets

(51) Int. Cl.
    *B65G 47/24*     (2006.01)
    *B65G 43/08*     (2006.01)
    *B65G 47/244*     (2006.01)
    *B41J 3/407*     (2006.01)
    *B65C 9/00*     (2006.01)
    B29C 49/36     (2006.01)

(56) References Cited

FOREIGN PATENT DOCUMENTS

| | | |
|---|---|---|
| DE | 20302578 U1 | 4/2003 |
| DE | 102004005994 A1 | 9/2005 |
| DE | 102006062510 A1 | 7/2008 |
| DE | 102007025521 A1 | 12/2008 |
| DE | 102008062580 A1 | 6/2010 |
| DE | 102009035880 A1 | 2/2011 |
| DE | 102009041527 A1 | 2/2011 |
| DE | 102009038810 A1 | 3/2011 |
| DE | 102011009393 A1 | 7/2012 |
| DE | 102011007520 A1 | 10/2012 |
| DE | 102011112281 B3 | 2/2013 |
| EP | 1 561 690 A1 | 8/2005 |
| EP | 2502834 A1 | 9/2012 |
| EP | 2511205 A2 | 10/2012 |
| EP | 2594498 A1 | 5/2013 |
| JP | H09295629 A | 11/1997 |
| WO | WO-9720738 A2 | 6/1997 |
| WO | WO-9908935 A1 | 2/1999 |

OTHER PUBLICATIONS

Notification of First Office Action, The State Intellectual Property Office of P.R. China, Application No. 201480048626.8, dated Nov. 16, 2016.

\* cited by examiner

APPARATUS FOR ORIENTING COMPONENTS OF A ROTARY MACHINE

FIELD OF THE DISCLOSURE

The present invention relates to an apparatus and a method for orienting components of a rotary machine, such as a container treatment machine.

BACKGROUND

Apparatuses for orienting individual components of a container treatment machine are already known from prior art. DE 10 2009 035 880 A1 shows orientation systems for orienting treatment modules attached to a container treatment machine. Two optical aids that are embodied, for example, as a laser pointer, are for this provided at the treatment module and marking fields on the container treatment machine, which can be arranged, for example, in the frame or on the rotor of the container treatment machine. The orientation can be determined and—if necessary—corrected by determining the respective distance of treatment modules from the marking fields provided. However, this approach has proven to be extremely complex, since respective marking fields and a laser pointer must be provided for each treatment module.

Furthermore, DE 10 2011 112 281 B3 shows an apparatus for treating packaging materials, where individual container treatment modules are provided which can, for example, be fixed to each other by connections. However, there is a risk that slight misalignments occur when fixing the individual modules among each other that must then be compensated by way of a readjustment method. This can possibly be very time consuming.

Starting out from prior art, it is an object of the present disclosure to provide an apparatus for orienting components of a rotary machine, where this apparatus is to enable the easiest possible orientation of the components of the rotary machine and is at the same time to be integrate in the most structurally simple manner into rotary machines.

SUMMARY

This object is believed to be satisfied by the apparatus for orienting components of a rotary machine according to some aspects of the present disclosure and the method for orienting components of a rotary machine according to some aspects of the present disclosure. Advantageous developments of the disclosure are also disclosed.

In some arrangements, the apparatus according to the disclosure for orienting components of a rotary machine, such as a container treatment machine, where the rotary machine includes a stator and a rotor and also at least one component which is arranged on the stator, includes at least one reference element which is arranged on the stator and a sensor which is arranged on the rotor so as to rotate with it, where the sensor is suitable for measuring the distance from the reference element and from the component, and the stator, the rotor and the component can be oriented in relation to one another based on the values measured by the sensor. In this way, only one sensor needs to be provided which can by rotation of the stator be guided to the respective positions to measure the orientation of respective components.

According to one embodiment, the sensor can determine the distance between the sensor and the reference element and/or the component while the rotary machine is at a standstill and/or the rotor of the rotary machine is moved. Adjustment of the individual components and in particular the correct orientation commonly occurs while the rotary machine is at a standstill. It is in this case sufficient if the sensor can measure the orientation of the individual components while the apparatus is at a standstill. It may prove to be advantageous, however, to have the sensor be able to determine the orientation of the components while the rotary machine is in operation. Any deviations due to vibrations in the machine can then be measured and possibly compensated.

In one embodiment, the sensor includes at least one of a pneumatically operated measuring gauge, an optical sensor, an ultrasonic sensor. Depending on the positioning of the sensor and the component to be measured, one of these embodiments can prove to be particularly advantageous.

It is in a further embodiment provided that the orientation of the stator, the rotor and the component relative to one another can be done manually or automatically. Based on the data obtained by way of the sensor, adjustment or orientation of the components can be done manually. Experience can also be exploited in this manner and, for example, minor deviations can be considered as being tolerable. Automated orientation of the components, however, offers the advantage that the orientation is effected in a most accurate manner.

It can be provided that at least one orientation apparatus is provided which is adapted to change a relative position of the stator to the rotor by a motion of the stator and the rotor in relation to one another. Since the stator and the rotor are very heavy components, manual orientation is possible only with considerable effort. This process can be facilitated by providing a respective orientation apparatus.

In one embodiment, the apparatus is characterized in that a plurality of reference elements is disposed on the stator. In this manner, determining the orientation of the stator and the rotor relative to one another is accomplished significantly better since several reference points are provided with which the position of the rotor relative to the stator can be determined in three dimensional space.

It can be provided that the rotary machine is a labeling machine or a blow molding machine or a direct printing machine or a filler or an inspection machine. The advantages of the apparatus for orienting components of a rotary machine can in this way be exploited in many fields, in particular in the beverage treatment industry.

Furthermore, the apparatus can be characterized in that the orientation apparatus can change the relative position of the stator and the rotor in relation to one another in 6 degrees of freedom. This makes it possible to perform not only translatory motions of the stator and the rotor to orient them relative to one another, but also to ensure orientation with respect to the rotational degrees of freedom.

By using, for example, one of the above apparatuses, a method for orienting components of a rotary machine including a stator and a rotor and at least one component can be realized, where the method includes positioning a sensor, which is arranged on the rotor so as to rotate with it, on a reference element which is arranged on the stator and a component which is arranged on the stator, and where the method includes measuring a distance between the sensor and the reference element and a distance between the sensor and the component, and where the stator, the rotor and the component are oriented in relation to one another based on the value measured by the sensor. Much more effective and more reliable orientation of the components of a rotary machine can be achieved with this method as compared to prior art.

In one embodiment of the method, the sensor determines the distance from the reference element and/or the component while the rotor is at a standstill or while the rotor is moving. Application of the method to stationary rotary machines enables correct orientation of the individual components when or after setting up the rotary machine. Application of the method for rotary machines in operation allows deviations to be monitored that arise, for example, due to vibration or heat development and there allows for possible readjustment.

In one embodiment, the orientation of the stator, the rotor and the component in relation to one another is performed manually or automatically. Manual adjustment of the orientation allows the incorporation of individual experience as well as the values measured by the sensor. Automatic orientation of the components in relation to one another can possibly be more reliable.

According to one embodiment of the method, a relative position of the stator to the rotor is changed by an orientation apparatus by a relative motion of the stator and the rotor to one another. The heavy components stator and rotor can thereby be oriented relative to one another, which is very difficult to do manually.

It can be provided that the sensor determines a distance from a plurality of reference elements. This allows the sensor to orient the rotor relative to the stator to determine three-dimensional space. It is also possible to detect incorrect orientations in the rotational degrees of freedom.

Furthermore, the method can include that the sensor determines a distance from each reference element and/or each component in at least two dimensions. It can thus be ensured by recording extensive measurement data that the orientation of the components of the rotary machine is as reliable as possible.

According to one embodiment, the method is characterized in that the orientation apparatus adjusts the relative position of the stator and the rotor in relation to one another in 6 degrees of freedom. Not only errors in the translational orientation of the stator and the rotor relative to one another can thereby be corrected, but also orientation of these components relative to one another in the rotational degrees of freedom.

DETAILED DESCRIPTION

Figure 1A:
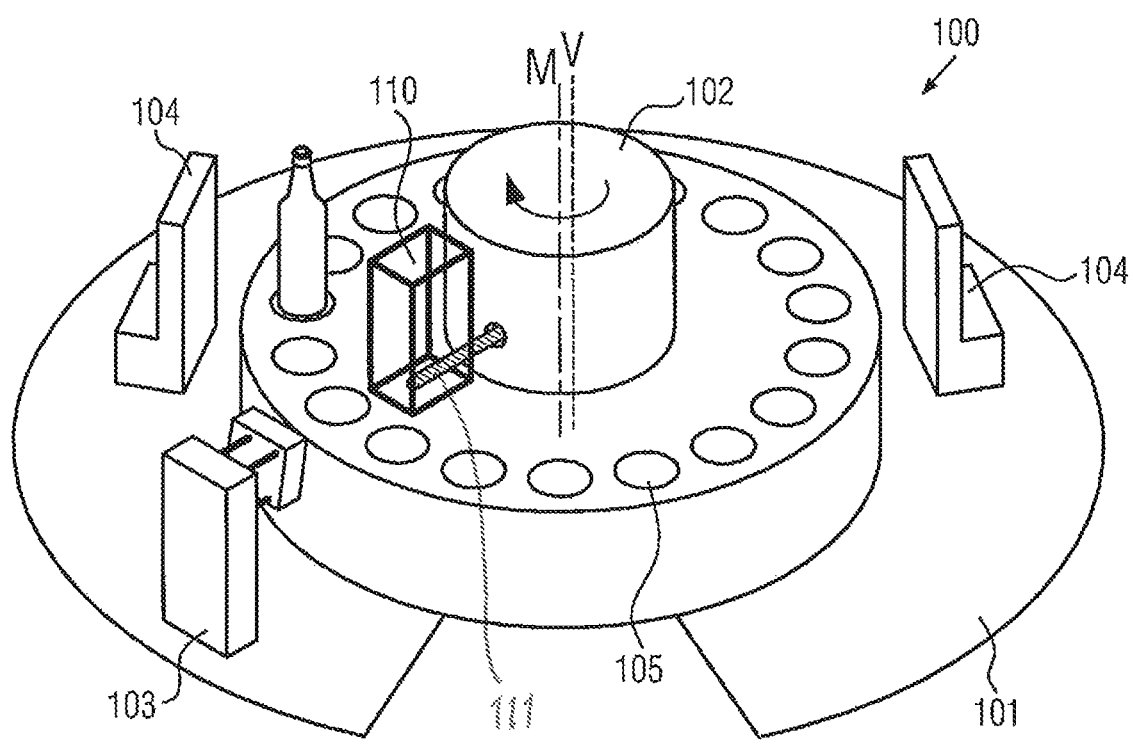
FIG. 1A is a first schematic representation of a container treatment machine with an apparatus according to the disclosure.
Figure 1B:
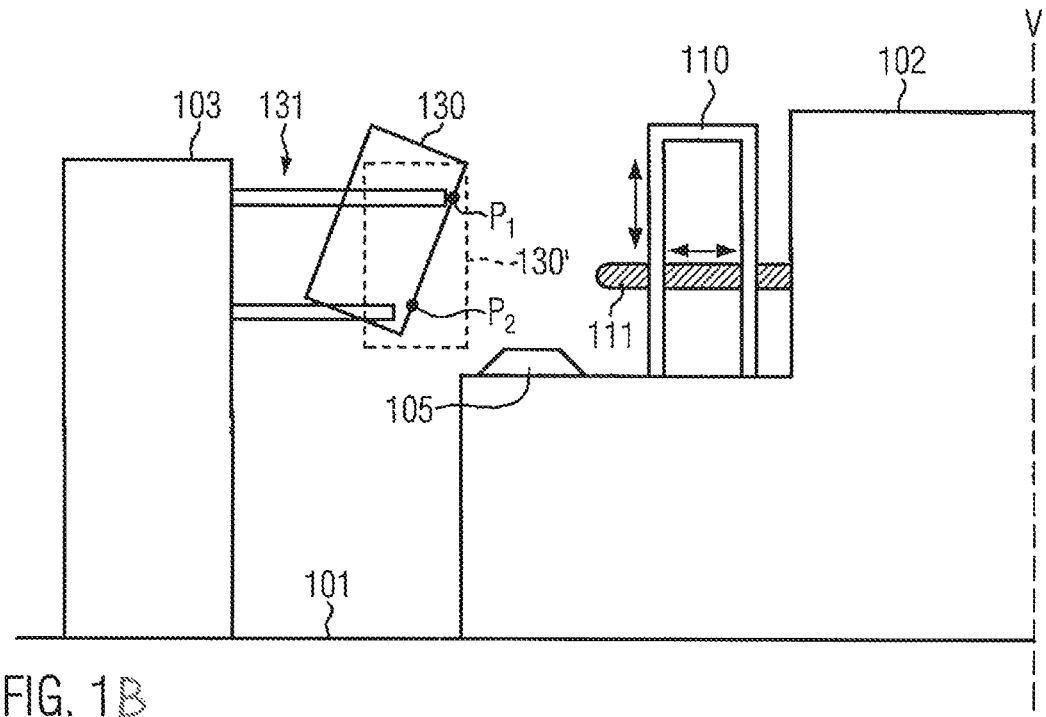
FIG. 1B is a second schematic representation of a container treatment machine with an apparatus according to the disclosure.
Figure 1C:
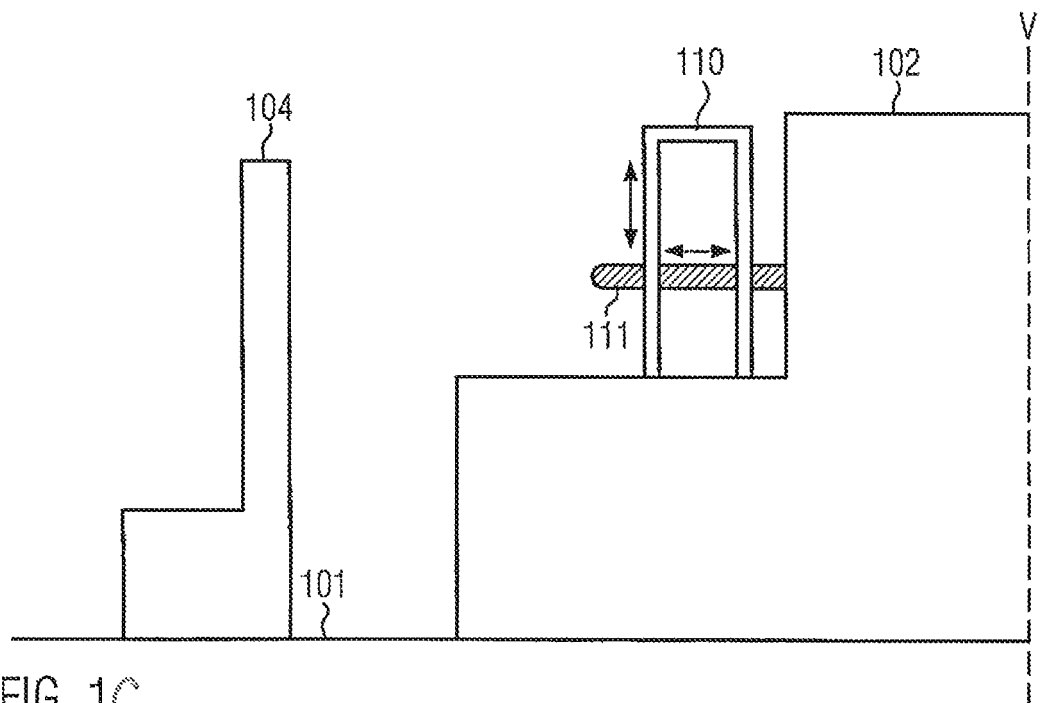
FIG. 1C is a third schematic representation of a container treatment machine with an apparatus according to the disclosure.

FIGS. 1A, 1B, and 1C show a container treatment machine 100, such as a direct printing machine, with an apparatus according to the present disclosure. The container treatment machine includes a stator 101 and a rotor 102. It is a rotary machine of a known type, for example, a direct printing machine, a labeling machine or a blow molding machine, as they are well known. Rotary machine 100 shown in FIG. 1A is a direct printing machine and therefore includes at least one printhead 103 disposed on stator 101. Rotor 102, in addition to container treatment stations 105 on which containers can be positioned for treatment in rotary machine 100, includes part 110 of the apparatus according to the present disclosure. This part 110 includes a sensor 111. This sensor 111 is suited to determine the distance to objects disposed across from it. The sensor 111 in this embodiment of the apparatus determines at least the position of a reference element 104 which is mounted on stator 101. By determining the distance between the sensor and reference element 104, orientation of rotor 102 can be determined about the latter's axis of rotation V relative to the center axis M of the stator. If, for example, the distance of the sensor 111 from the reference element 104 must measure four meters in the event that the rotor 102 is oriented correctly relative to stator 101, then the deviation in the distance from a reference element 104 can be used in order to draw conclusions about the correct orientation of the rotor. The readings thus obtained from the sensor can therefore be used to correctly orient stator 101 relative to rotor 102. It is particularly preferred to have reference elements 104 be provided on stator 101, for example, at regular angular intervals from which the sensor 111 can determine the distance. It can thereby be ensured that the precise position of axis of rotation V relative to center axis M of the stator is known, as presently schematically shown in FIG. 1A.

However, the sensor 111 continues to be configured such that it can measure the distance from other components of the container treatment machine. As common direct printing methods (or other container treatment methods) partly entail considerable requirements in terms of the orientation of the container treatment units, such as of printheads relative to container treatment stations 105, the sensor 111 is also adapted to determine the distance from respective components such as printheads 103. This ensures that, for example, printheads 103 or any other imaginable container treatment units have the correct distance from rotor 102 and also from the containers provided in container treatment stations 105.

To this end, FIG. 1B shows sensor 111 in a schematic view while it determines the distance from a printhead 130. Printhead 130 itself is commonly connected via connections 131 to entire printhead module 103 in which, for example, ink storage containers can be accommodated. It is with connection 131 also commonly possible to rotate printhead 130 and, for example, to orient it straight as is evident from position 130' shown by dashed lines. When setting up or retooling a respective container treatment machine, however, the initial orientation of the printhead modules can be crucial for the quality of the printed images created therewith on containers. If the printheads are tilted relative to the actually intended position, then this can adversely affect the print image created. Sensor 111 is used for this, while the rotary machine is at a standstill, to determine the distance of printhead 130 from sensor 111.

The sensor 111 can for this be configured, for example, as a pneumatically operated measuring gauge which can be extended to touch the printhead, for example, at two points P1 and P2. Firstly, the precise distance of printhead 130 from the sensor head can be determined (in relation to its original position, as shown in FIG. 1B) and, secondly, it can be measured by contact of the two points, which are located at different levels, whether printhead 130 is inclined with respect to preferred position 130'. Sensor 111 is preferably provided in frame 110 with which it can be moved both horizontally and vertically. However, sensor 111 can also be configured as an optical sensor or an ultrasonic sensor or include a respective one. It can thereby be avoided that sensor 111 must be swept across container handling stations 105, which further provides the advantage that sensor 111 can determine the position of the stator relative to the rotor or of the rotor relative to the container treatment elements also during operation of the rotary machine. The distance of the printheads 130 from axis of rotation V of the carousel or rotor 102, respectively, can then be determined during every revolution, for example, by way of a laser which is formed as sensor 111 co-rotating on the rotor. Motors provided accordingly can then possibly perform readjustment of the orientation of rotor 102 relative to stator 101 and the printhead modules arranged thereon. The data collected in the sensor or by sensor 111, in particular distance data, is used for this purpose.

FIG. 1C shows the determination of distance by way of sensor 111, which can be configured as described in FIG. 1B, from a reference element 104 that is fixedly positioned on stator 101. To ensure that the correct position determination of rotor 102 with respect to stator 101 is obtained, reference elements 104 must be positioned on stator 101 with highest precision. In order for reference element 104 to actually be able to be used to determine the orientation of rotor 102 relative to stator 101 or to determine the orientation of axis of rotation V of rotor 102 and center axis M of stator 101, as shown in FIG. 1A, it is preferred to attach the reference element 104 with respect to its intended position deviating by only a few tenths of a millimeter when mounting it on stator 101. It is intended, for example, that the reference element 104 is exactly one meter away from the center axis M of stator 101, then the actual position of reference element 104 should deviate only by a maximum of 0.5 mm, preferably not more than 0.2 mm, and preferably not more than 0.1 mm from the intended position. It can thus be ensured that when the distance is measured by the sensor 111, where the latter's positioning must also be done in an accordingly accurate manner, be sufficiently precise to ensure positioning of rotor 102 and in particular its axis of rotation V relative to center axis M of the stator 101 with high precision. Determining the distance of sensor 111 provided on rotor 102 from reference elements 104 on the stator 101 therefore enables precise orientation in at least three dimensions, provided that reference element 104 or the reference elements exhibit a flat surface, as is presently illustrated.

However, it may also be necessary to take into account possible rotational degrees of freedom when positioning rotor 102 with respect to stator 101.

Figure 2A:
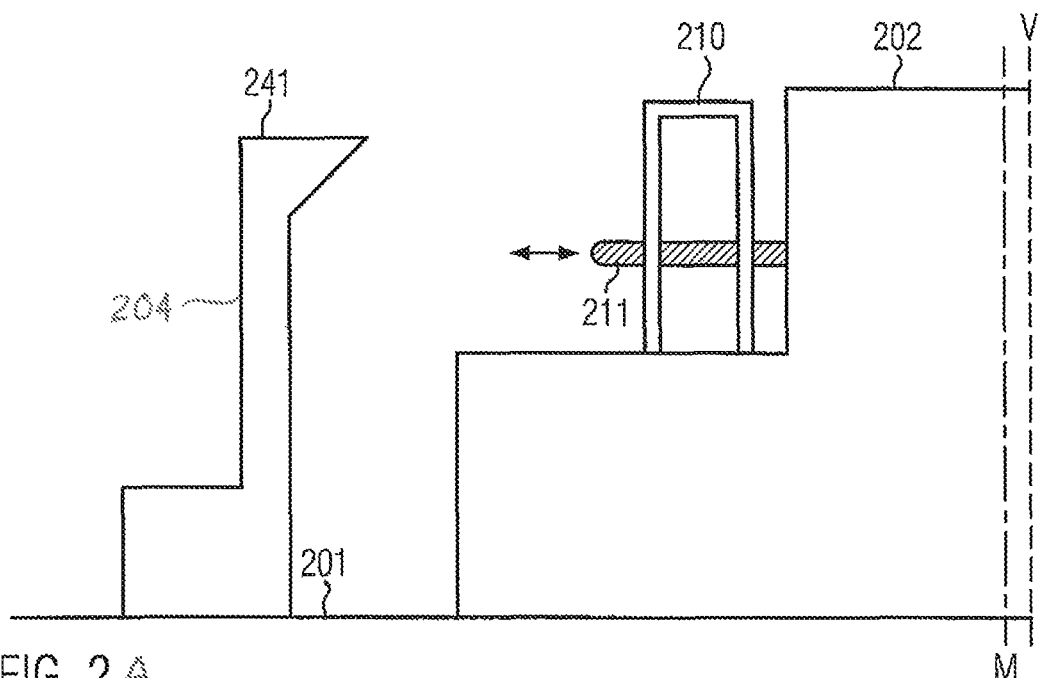
FIG. 2A is a first schematic representation of a further embodiment of the apparatus according to the disclosure.

For this purpose, FIG. 2A shows a further embodiment of the apparatus according to the present disclosure, where sensor 211 is there as well with its frame 210 provided on stator 202 and a reference element 204 is according to a further embodiment arranged on stator 201. Reference element 204 differs from reference element 104, as was illustrated in FIG. 1, by beveled surface 241 with which reference element 204 contacts sensor 211. This beveled surface, in addition to determining the distance of sensor 211 from reference elements 204, allows illustrating possible tilting of axis of rotation V of the rotor 202 relative to center axis M of the stator 201.

Figure 2B:
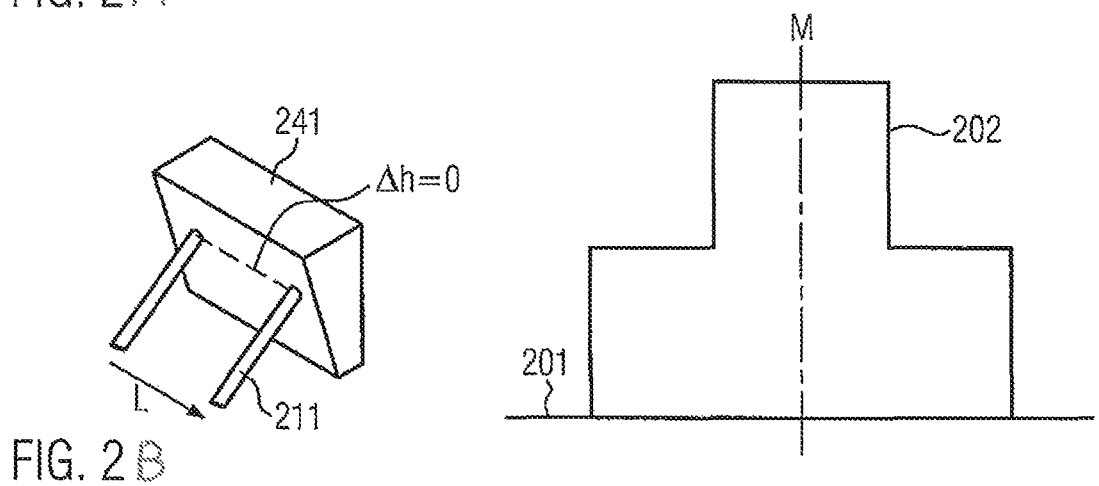
FIG. 2B is a second schematic representation of the embodiment of FIG. 2A.

For this, FIGS. 2B and C show two different cases of orientation of axis of rotation V of rotor 202 relative to center axis M of stator 201. In FIG. 2B, axis of rotation V and center axis M are oriented correctly. If sensor 211 is in such a case by rotation of rotor 202 moved along the surface of reference element 241, then the height of sensor 211 does not change in relation to the surface of reference element 241. The difference in height Δh is equal to zero. This is indicated by the dashed line. In such a case, axis of rotation V and the center axis M match in terms of in their rotational degrees of freedom. This means that they are parallel to one another. If more than one reference element 204 is provided, then also the distance between axis of rotation V and center axis M can be determined by further rotating rotor 202 and determining the distance of sensor 211 from reference element 204. In the example illustrated in FIG. 2B, however, this deviation is for reasons of clarity equal to zero.

Figure 2C:
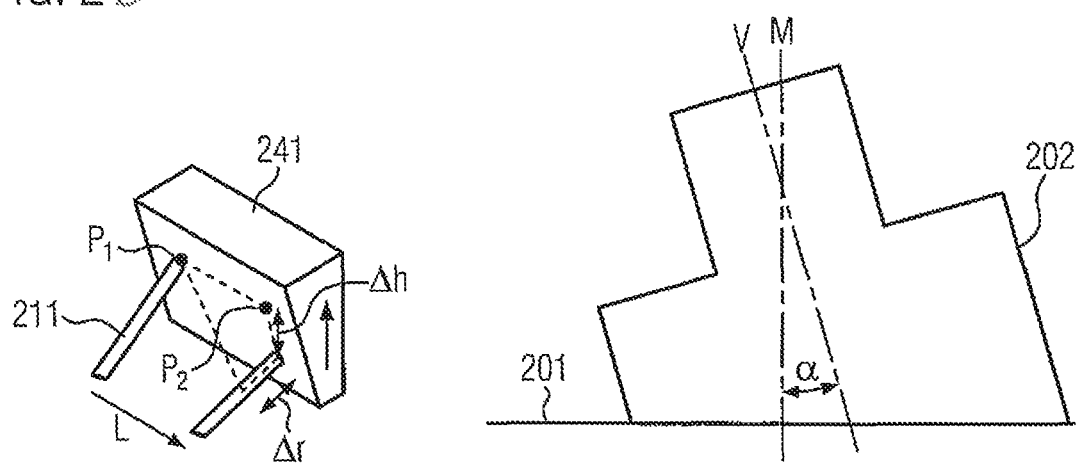
FIG. 2C is a third schematic representation of the embodiment of FIG. 2A.

If, however, axis of rotation V and center line M are not parallel but include at least an angle α unequal zero, as shown in FIG. 2C, then measuring the distance of the sensor 211 to the surface of reference element 241 in this embodiment delivers a different result. If rotor 202 rotates about axis of rotation V and thereby moves sensor 211 along the surface of the reference element over the distance L from point P1 to point P2, then an offset in height Δh arises due to the inclination of axis of rotation V relative to center axis M by the angle α when sensor 211 runs along the surface of reference element 241. This offset could also be observed for a reference element 204 according to the embodiment as shown in FIGS. 1A-C. From this difference in height Δh, however, beveled surface 241 allows detecting a change of the distance Δr of the surface of the reference element from sensor 211 at points P1 and P2. This can with a known surface structure of reference element 204 be used to determine angle α and thereby ensure correct orientation in the rotational degrees of freedom by balancing rotor 202 relative to stator 201. Since rotor 202 should generally rotate about only a single axis, it is sufficient if orientation of rotor 202 relative to stator 201 is in this manner determined in four degrees of freedom, i.e. three translational degrees of freedom and one rotational degree of freedom. However, it can also depending on the configuration of the container treatment machine be provided to be able to determine the position of axis of rotation V relative to center axis M in three translational degrees of freedom and three rotational degrees of freedom.

If the distances from the rotor to the stator are known by measuring the distances of the sensor to the reference elements or only to the reference element, then the rotor can be oriented relative to the stator. Since sensor 211 is also able to determine the orientation of container handling apparatuses, such as printhead modules, a further change in the orientation of the rotor or adjustment of the container treatment units relative to the orientation of the stator and the rotor can be effected on the basis of the data measured by sensor 211. A number of motors being provided in the stator and/or in the rotor and orienting the two components, i.e. the stator and the rotor, can there be actuated using this data. The container treatment units, such as printhead modules, usually themselves include their own motors. Motors are commonly provided in printhead modules for orientation of the individual printheads in relation to the surface of the containers in the rotary machines. A respective control unit can therefore be provided that uses the measurement data of the sensor for actuating the motors of the printheads to orient them relative to the rotor according to the positioning requirements.

It can in this manner not only be ensured that the entire stator is correctly oriented relative to the rotor and that periodic distance variations do not arise there, but it can be ensured that the individual container treatment modules exhibit the correct distance and the correct orientation relative to every container treatment station.

Even though the apparatus according to the present disclosure can be used for orienting the components of the rotary machine relative to one another, it is advantageously also suitable to monitor the on-going operation of the rotary machine. However, this applies only if the distance is determined in a contactless manner, as otherwise collisions with containers transported in the rotary machine could occur. If the sensor is configured as an optical or ultrasonic sensor, then monitoring the orientation of all components that can be detected by the sensor by rotation about axis of rotation V of the rotor can be determined during the entire operation. If a change in the distance or orientation of one or more component/s of the rotary machine occurs, for example, due to vibrations during operation of the rotary machine, then the optical sensor can there serve as an indicator of such deviations in that it measures the distance from every component and from every reference element for every rotation of the rotor. The data thus obtained can be used, for example, to enable real-time orientation of the printheads. It is in such a case preferable to provide at least two sensors which are, for example, in frame 110 shown in FIG. 1C disposed above each other. Determining the distance of the components of the rotary machine relative to one another can thereby occur in two dimensions at the same time, which enables, for example, detecting tilting of printheads as shown in FIG. 1B. The readings of the sensor can also be used to presently record in real-time any tolerances being exceeded, and the control unit can possibly use the readings obtained for real-time orientation of movable components. Providing two sensors, as presently described, can generally be advantageous in every embodiment.

Since the absolute errors of orientation of the components or of the stator and the rotor relative to one another are in the majority of cases located only in the millimeter range, in particular adjusting drives and there in particular actuators are preferred. They allow for very precisely actuatable motions, even on small scales, such as in the millimeter range. In addition, electronic actuation allows for a very fast response to the readings of the sensor.

Although the apparatus for orienting components of a rotary machine was substantially described as an automatically operating apparatus which allows for re-orientation of components relative to one another based on the readings obtained, the readings obtained from the sensor can also be used by an operator to perform fine adjustments, for example, at the components of the rotary machine or to the rotational behavior of the rotor.

The invention claimed is:

1. An apparatus for orienting components of a rotary machine, where said rotary machine comprises a stator and a rotor and also at least one component which is arranged on said stator, wherein said apparatus comprises at least one reference element which is arranged on said stator and a sensor which is arranged on said rotor so as to rotate with said rotor, where, in motion, a rotational velocity of the sensor relative to the stator is identical to a rotational velocity of the rotor relative to the stator and a rotational axis of the sensor is identical to a rotational axis of the rotor, where said sensor is suitable for measuring the distance from said reference element and from said component, and said stator, said rotor and said component can be oriented in relation to one another based on the values measured by said sensor, the sensor adapted to determine the orientation of the rotor relative to the stator in four degrees of freedom, comprising three translational degrees of freedom and one rotational degree of freedom.

2. An apparatus according to claim 1, wherein said sensor can determine the distance between said sensor and said reference element and/or said component while said rotary machine is at a standstill and/or said rotor of said rotary machine is moved.

3. An apparatus according to claim 1, wherein said sensor comprises at least one of a pneumatically operated measuring gauge, an optical sensor, and an ultrasonic sensor.

4. An apparatus according to claim 1, wherein the orientation of said stator, said rotor and said component relative to one another can be done manually or automatically.

5. An apparatus according to claim 1, wherein at least one orientation apparatus is provided which is suited to change a relative position of said stator to said rotor by a relative motion of said stator and said rotor in relation to one another.

6. An apparatus according to claim 1, wherein a plurality of reference elements is arranged on said stator.

7. An apparatus according to claim 1, wherein said rotary machine is a labeling machine or a blow molding machine or a direct printing machine or a filler or an inspection machine.

8. An apparatus according to claim 5, wherein said orientation apparatus can change the relative position of said stator and said rotor in relation to one another in 6 degrees of freedom.

9. A method for orienting components of a rotary machine comprising a stator and a rotor and at least one component, wherein said method comprises:
   positioning a sensor, which is arranged on said rotor so as to rotate with the rotor, on a reference element which is arranged on said stator and a component which is arranged on said stator where a rotational velocity of the sensor relative to the stator is identical to a rotational velocity of the rotor relative to the stator and a rotational axis of the sensor is identical to a rotational axis of the rotor; and
   measuring a distance between said sensor and said reference element and a distance between said sensor and said component; and
   orienting said stator, said rotor and said component in relation to one another based on values measured by said sensor, wherein the orientation of the rotor relative to the stator is determined in four degrees of freedom, comprising three translational degrees of freedom and one rotational degree of freedom.

10. A method according to claim 9, wherein said sensor determines the distance from said reference element and/or said component while said rotor is at a standstill or while said rotor is moving.

11. A method according to claim 9, wherein the orientation of said stator, said rotor and said component relative to one another is done manually or automatically.

12. A method according to claim 9, wherein a relative position of said stator to said rotor is changed by an orientation apparatus by a relative motion of said stator and said rotor in relation to one another.

13. A method according to claim 9, wherein said sensor determines a distance from a plurality of reference elements.

14. A method according to claim 9, wherein said sensor determines a distance from each reference element and/or each component in at least two dimensions.

15. A method according to claim 12, wherein said orientation apparatus adjusts the relative position of said stator and said rotor in relation to one another in 6 degrees of freedom.

16. An apparatus according to claim 1, wherein the rotary machine comprises a container treatment machine.

* * * * *